(12) United States Patent
Takenaka et al.

(10) Patent No.: US 8,261,092 B2
(45) Date of Patent: Sep. 4, 2012

(54) IMAGE RETRIEVAL SYSTEM AND METHOD

(75) Inventors: Maiko Takenaka, Kanagawa (JP); Shogo Oneda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 943 days.

(21) Appl. No.: 12/314,110

(22) Filed: Dec. 4, 2008

(65) Prior Publication Data

US 2009/0144560 A1 Jun. 4, 2009

(30) Foreign Application Priority Data

Dec. 4, 2007 (JP) .................. 2007-313770
Oct. 15, 2008 (JP) .................. 2008-266277

(51) Int. Cl.
*H04N 1/44* (2006.01)
*G06F 11/30* (2006.01)

(52) U.S. Cl. ......... 713/189; 713/176; 380/243; 380/285

(58) Field of Classification Search .................. None
See application file for complete search history.

(56) References Cited

U.S. PATENT DOCUMENTS 6,513,118 B1 * 1/2003 Iwamura ................ 713/176
2007/0198636 A1 8/2007 Inamoto et al.

FOREIGN PATENT DOCUMENTS

JP 2000-099234 4/2000
JP 2006-074770 3/2006

OTHER PUBLICATIONS

Abstract of JP 11-177977 published Jul. 2, 1999.
Abstract of WO/2001/003019 published Jan. 11, 2001.

* cited by examiner

*Primary Examiner* — Kaveh Abrishamkar
(74) *Attorney, Agent, or Firm* — Harness, Dickey & Pierce, P.L.C.

(57) ABSTRACT

An image retrieval system that provides secured image data in response to a query specified by a user. The system includes a data retrieval unit, an encryption unit, and an output unit. The data retrieval unit is configured to retrieve image data relevant to the specified query from a collection of image data. The encryption unit is configured to encrypt at least a portion of the retrieved image data according to the specified query. The output unit is configured to output the at least partially encrypted image data to the user. The image data represents an image formed of one or more regions each having a keyword associated therewith. The encrypted portion is decryptable by the user only when the user is authorized to view the entire image.

18 Claims, 10 Drawing Sheets

FIG. 4

```
<line shape = "rect" coords = "480,20,640,400">
     <keyword>X-MOTOR PRESIDENT</keyword>        ⎫
     <keyword>TARO YAMADA</keyword>               ⎬ T1
</line>                                           ⎭
<line shape = "rect" coords = "0,20,480,110">    ⎫
     <keyword>NEW CAR MODEL</keyword>             ⎬ T2
     <keyword>X-MOTOR COMPANY</keyword>           ⎭
</line>
<line shape = "rect" coords = "0,0,640,20">      ⎫ T3
</line>                                           ⎭
<line shape = "rect" coords = "0,0,0,0">         ⎫
     <keyword>CAR</keyword>
     <keyword>X-MOTOR</keyword>                   ⎬ T4
     <keyword>YAMADA</keyword>
     <keyword>TARO</keyword>
</line>                                           ⎭
```

FIG. 5A

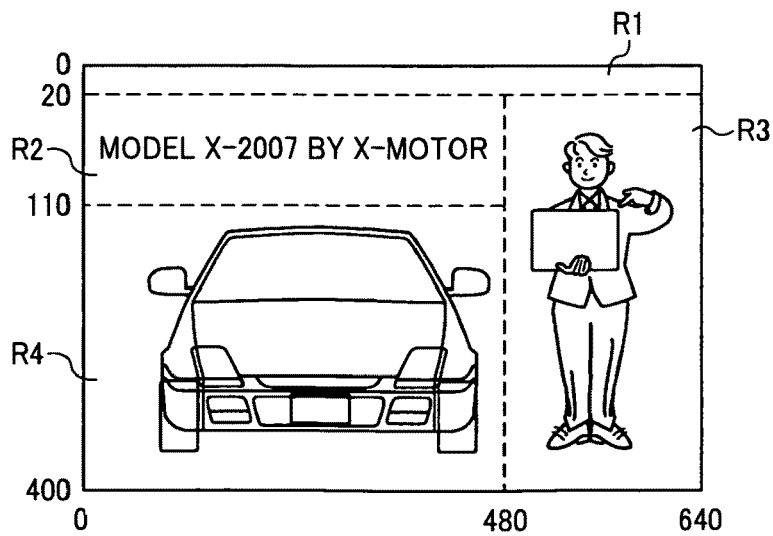

FIG. 9

```
<line shape = "rect" coords = "480,20,640,400">
    <keyword>X-MOTOR PRESIDENT</keyword>         } T11
    <keyword>TARO YAMADA</keyword>
</line>
<line shape = "rect" coords = "0,20,480,110">
    <keyword>NEW CAR MODEL</keyword>              } T12
    <keyword>X-MOTOR COMPANY</keyword>
</line>
<line shape = "rect" coords = "0,110,480,400">    } T13
</line>
<line shape = "rect" coords = "0,0,0,0">
    <keyword>CAR</keyword>
    <keyword>X-MOTOR</keyword>                    } T14
    <keyword>YAMADA</keyword>
    <keyword>TARO</keyword>
</line>
```

FIG. 11

| KEYWORD | URL |
|---|---|
| STRIPED TABBY | /usr/image/animal_1.jpm |
| AIRPLANE | /usr/image/airplane.jpm |
| X-MOTOR NEW MODEL | /usr/image/custom_car.jpm |
| NETWORK | /usr/image/network.jpm |
| ⋮ | ⋮ |

IMAGE RETRIEVAL SYSTEM AND METHOD

CROSS-REFERENCE TO RELATED APPLICATIONS

The present patent application claims priority pursuant to 35 U.S.C. §119 from Japanese Patent Application Nos. 2007-313770 and 2008-266277, filed on Dec. 4, 2007 and Oct. 15, 2008, respectively, the contents of each of which are hereby incorporated by reference herein in their entirety.

BACKGROUND OF THE INVENTION

1. Field of the Invention

The present invention relates to an image retrieval system and method, and more particularly, to an image retrieval system and method that searches a collection of secured image data to provide a user with an image corresponding to a query specified by the user.

2. Discussion of the Background

Image retrieval systems enable computer users to search for and view desired images on a computer display by specifying a query term relevant to the image data. Various methods have been proposed to manage image data in such retrieval systems, some of which feature enhanced security to prevent unauthorized access or viewing of confidential information contained in the image data.

For example, one conventional method controls access to image data that has annotations (i.e., explanatory notes, highlights, lines, polygons, etc.) superimposed on the image contents. This data retrieval system uses separate tables to manage different access levels for image data and for annotation data. Upon receiving a query specified by a user, the system references the image data management table to retrieve an image that is relevant to the specified query and matches the user's access level. The system then references the annotation data management table to determine whether or not the annotation for the retrieved image also matches the user's access level, and outputs only that data having both image and annotation contents available for that particular user.

A drawback of the conventional method is that a user cannot access image data which is generally relevant to the specified query, but contains some confidential information not matching the user's access level. Such unavailability of relevant data is inconvenient to users wishing to access as much information as possible, making the system functionally less advantageous than it could be.

SUMMARY OF THE INVENTION

Exemplary aspects of the present invention are put forward in view of the above-described circumstances, and provide a novel image retrieval system and method that searches a collection of secured image data to provide a user with an image corresponding to a query specified by the user.

In one exemplary embodiment, the novel image retrieval system that provides secured image data in response to a query specified by a user. The system includes a data retrieval unit, an encryption unit, and an output unit. The data retrieval unit is configured to retrieve image data relevant to the specified query from a collection of image data. The encryption unit is configured to encrypt at least a portion of the retrieved image data according to the specified query. The output unit is configured to output the at least partially encrypted image data to the user. The image data represents an image formed of one or more regions each having a keyword associated therewith. The encrypted portion is decryptable by the user only when the user is authorized to view the entire image.

In one exemplary embodiment, the image retrieval method provides secured image data in response to a query specified by a user. The method includes steps of data retrieval, encryption, and output. The data retrieval step retrieves image data relevant to the specified query from a collection of image data. The encryption step encrypts at least a portion of the retrieved image data according to the specified query. The output step outputs the at least partially encrypted image data to the user. The image data represents an image formed of one or more regions each having a keyword associated therewith. The encrypted portion is decryptable by the user only when the user is authorized to view the entire image.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 4 shows an example of hidden text or associated keywords for a single codestream used in the JPIP server of FIG. 1;

FIGS. 5A through 5D each shows an example of an image area represented by the codestream of FIG. 4;

FIG. 9 shows another example of hidden text or associated keywords for the codestream representing the image area described in FIGS. 5A through 5D;

FIG. 11 shows an example of a lookup table for listing primary keywords associated with JPM files.

DETAILED DESCRIPTION OF PREFERRED EMBODIMENTS

Figure 1:
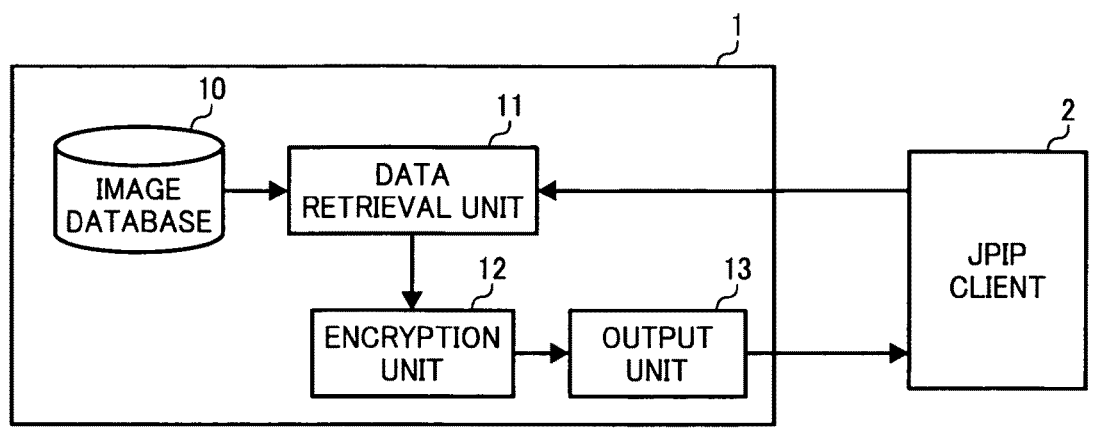
FIG. 1 is a block diagram illustrating a JPIP server incorporating one embodiment of an image retrieval system according to this patent specification.

The following specification describes an image retrieval system that provides a user with secured image data via a network. Embodiments described herein communicate image data according to the JPEG 2000 Internet Protocol (JPIP) standard defined in ISO/IEC-15444, and the image data handled herein includes "codestreams" or bitstreams according to the JPEG 2000 file format standard defined in ISO/IEC-15444, in particular, to the JPEG 2000 File Format—Multi-layer (JPM). However, as can be appreciated by those skilled in the art, the techniques disclosed in this patent specification may be implemented using any suitable image communication protocol other than JPIP, and any suitable image data format other than the JPEG file formats may be used instead.

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views, exemplary embodiments of the present patent application are described.

FIG. 1 is a block diagram illustrating a JPIP server 1 incorporating one embodiment of the image retrieval system according to this patent specification.

As shown in FIG. 1, the JPIP server 1 includes an image database 10, a data retrieval unit 11, an encryption unit 12, and an output unit 13. The JPIP server 1 receives a query specified by a user on a JPIP client 2, and transmits thereto image data relevant to the specified query.

In the JPIP server 1, the image database 10 stores a collection of image data each having one or more associated keywords used for retrieval. Upon receiving a query from the JPIP client 2, the data retrieval unit 11 searches the image database 10 for image data having a keyword corresponding to the specified query. When such data is retrieved, the encryption unit 12 encrypts the retrieved data, so that the output unit 3 outputs the data to the JPIP client 2 in a secure, encrypted form.

Figure 2:
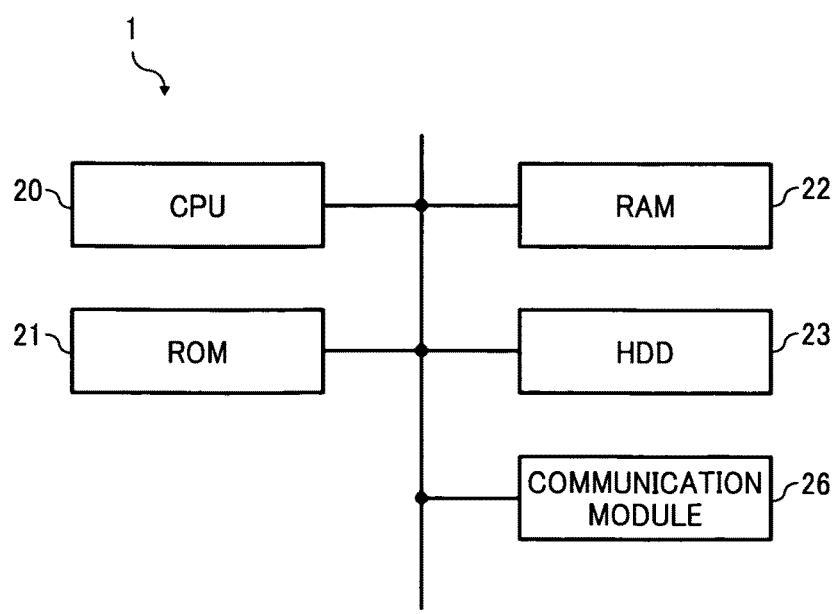
FIG. 2 is a block diagram schematically illustrating a hardware configuration of the JPIP server of FIG. 1.

FIG. 2 is a block diagram schematically illustrating a hardware configuration of the JPIP server 1.

As shown in FIG. 2, the JPIP server 1 includes a computer system formed of a central processing unit (CPU) 20, a read-only memory (ROM) 21, a random-access memory (RAM) 22, a hard disk drive (HDD) 23, and a communication module 26.

In the JPIP server 1, the ROM 21 and the HDD 23 store computer programs that allow the computer system to function as a JPIP server. The CPU 20 controls operation of specific portions of the JPIP server 1 by executing programs written into the RAM 22 from the ROM 21 or from the HDD 23.

The functional units described in FIG. 1 are implemented by the computer system of FIG. 2. Specifically, the image database 10 is stored in the HDD 23, the data retrieval unit 11 and the encryption unit 12 both are implemented by the CPU 20, and the output unit 13 is implemented by the CPU 20 and the communication module 26 working in coordination.

Figure 3:
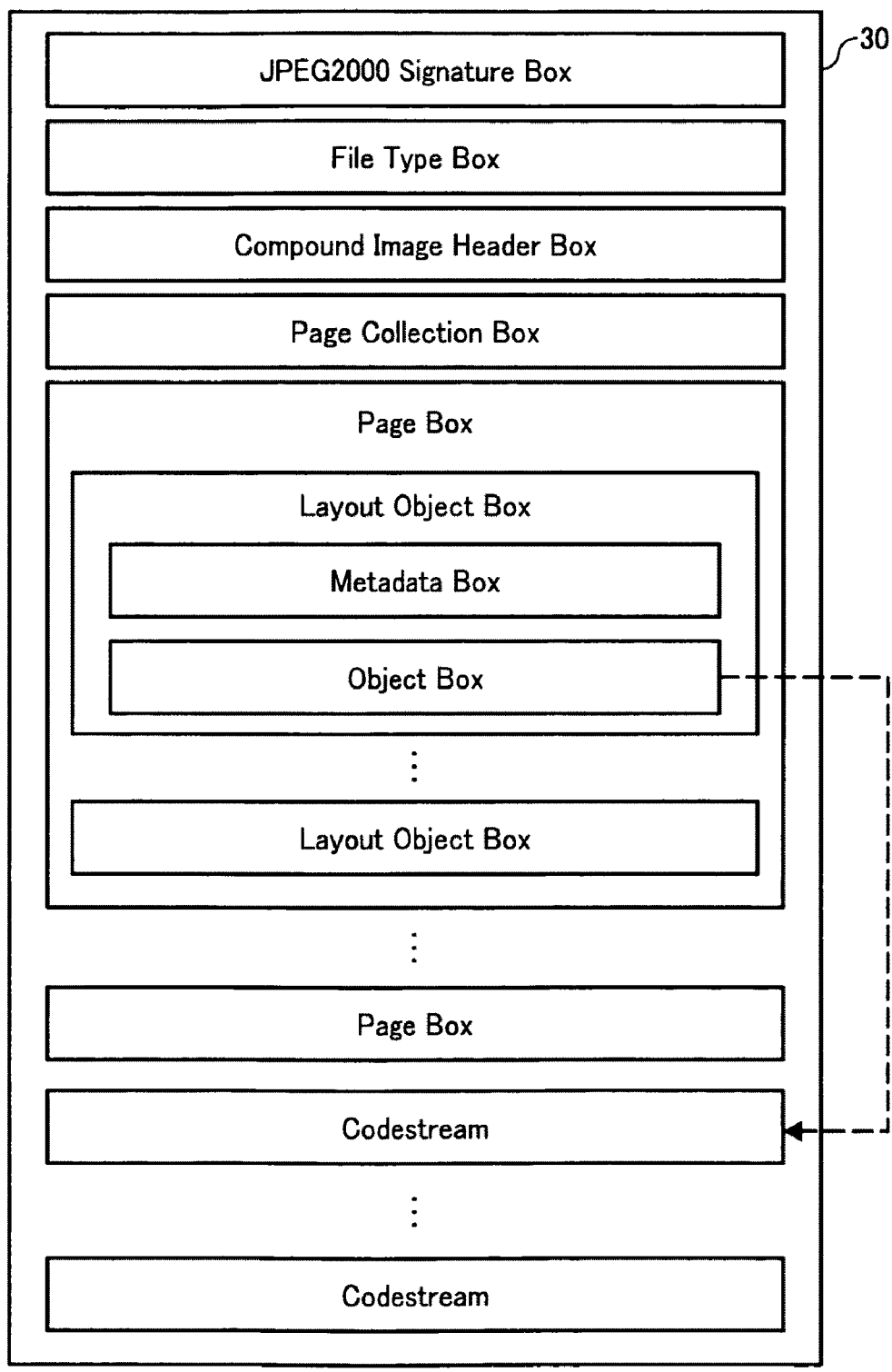
FIG. 3 describes a conceptual structure of a JPM file or image data set handled by the JPIP server of FIG. 1.

A conceptual structure of a JPM file or image data set 30 handled by the JPIP server 1 according to this patent specification is shown in FIG. 3.

As shown in FIG. 3, the JPM file 30 includes a JPEG 2000 Signature box, a File Type box, a Compound Image Header box, a Page Collection box, one or more Page boxes, and one or more JPEG 2000 codestreams each representing a single object or image area.

In the JPM file 30, the JPEG 2000 Signature box identifies the data as being part of the JPEG 2000 family of file formats. The File Type box specifies file type, version, and compatibility information of the JPM file 30. The Compound Image Header box contains general information about the image represented by the JPM file 30. The Page Collection box contains information for locating individual pages contained in the JPM file 30, followed by the Page boxes each containing information used to image a single page of the JPM file 30.

The Page box contains one or more Layout Object boxes, each having a Metadata box and at least one Object box. The Object box is associated with a specific codestream, and the Metadata box contains information on the corresponding codestream. While not depicted in the drawing, the JPM file 30 may contain additional Metadata boxes in the Page Collection box and/or the Page box, which can describe attributes of image data, such as intellectual property right information or vendor-specific information.

According to this patent specification, an image area represented by a single codestream is formed of one or more image regions each having a keyword associated therewith, and the Metadata box of each Layout Object box contains hidden text (HTX) describing the associated keyword for the corresponding codestream. Such hidden text keywords are used to retrieve image data relevant to a specified query, and to encrypt the retrieved image data according to the specified query.

FIG. 4 shows an example of such hidden text or associated keywords for a single codestream used in the JPIP server 1, and FIGS. 5A through 5D each shows an example of an image area represented by the codestream of FIG. 4.

As shown in FIG. 4, the hidden text may be written in extensible markup language (XML), which in this case is formed of four sections T1 through T4. In each section, the first line defines a rectangular image region in the image area of FIG. 5A, with numbers in quotation marks indicating horizontal and vertical coordinates for its upper left and lower right corners, respectively. Subsequent lines of each section contain tagged words or phrases, each of which represents a keyword to be associated with the defined image region.

For example, the first section T1 defines a rectangular region R3 in FIG. 5A with an upper left corner (480, 20) and a lower right corner (640, 400), which has associated keywords "X-MOTOR PRESIDENT" and "TARO YAMADA". Similarly, the second section T2 defines a rectangular region R2 in FIG. 5A with an upper left corner (0, 20) and a lower right corner (480, 110), having associated keywords "NEW CAR MODEL" and "X-MOTOR COMPANY".

In addition, the third section T3 defines a rectangular region R1 in FIG. 5A with an upper left corner (0, 0) and a lower right corner (640, 20) with no keyword associated therewith. The fourth section T4 presents keywords "CAR", "X-MOTOR", "YAMADA", and "TARO" to be associated with coordinates (0, 0) and (0, 0) defining no rectangular image region in FIG. 5A.

Every keyword contained in the hidden text (T1, T2, T3, and T4), whether or not associated with a particular image region, can be used to retrieve the codestream or image area when corresponding to a query term specified by a user on the JPIP client 2.

Further, the image regions R3 and R2 having the hidden text keywords (T1 and T2, respectively) represent a portion to be viewed by a user specifying a query term corresponding to the keyword, whether the user is an authorized user or not. The term "authorized user" as used herein refers to a person permitted to access and view the entire image data served by the JPIP server 1, for example, a subscriber of an image search service implemented by the JPIP server 1.

In addition, the image region R1 having no hidden text keyword (T3) represents a portion that can be viewed by any user irrespective of the query term used to retrieve the codestream.

With reference to FIG. 1, upon receiving a query specified by a user on the JPIP client 2, the data retrieval unit 11 retrieves a relevant codestream from the image database 10 by comparing the specified query against the hidden text keywords contained in each JPM file.

The relevant image data thus retrieved is then forwarded to the encryption unit 12, which partially or selectively encrypts each codestream based on the image regions defined in the hidden text. Specifically, in the present embodiment, the encryption unit 12 selectively encrypts an entire image area except for a portion relevant to, i.e., having a hidden text keyword corresponding to, the specified query.

After the selective encryption, the image data is sent to the output unit 13 for transmission to the JPIP client 2. The encrypted portion of the image data is decryptable and thus made viewable with a suitable display only by an authorized user on the JPIP client 2, while the relevant and unencrypted portion of the image data remains viewable even by an unauthorized user.

Figure 5B:
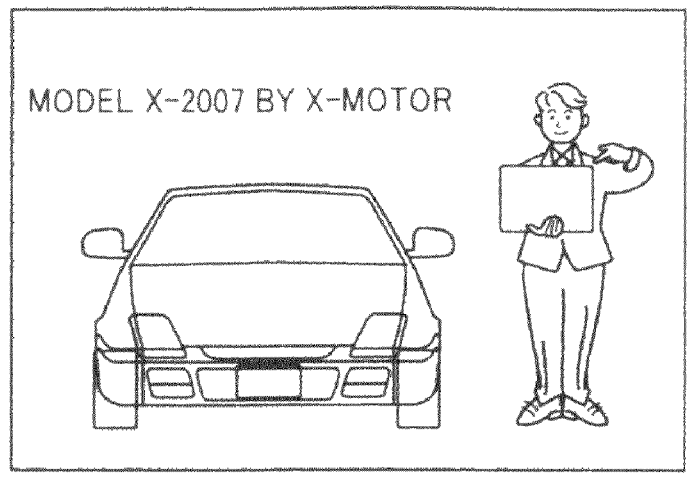
Figure 5C:
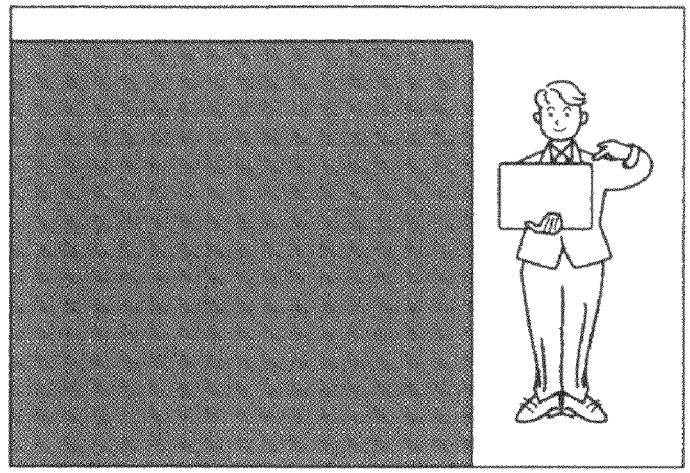
Figure 5D:
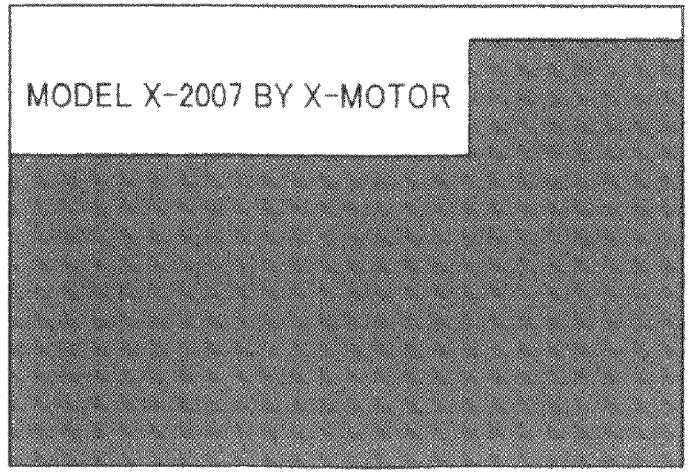

Thus, specifying a query term such as "CAR" or "X-MOTOR" allows retrieval of the codestream or image area of FIG. 5A. Such image data is displayed completely as shown in FIG. 5B for an authorized user, but is not for an unauthorized user. However, specifying a query term such as "X-MOTOR PRESIDENT" or "TARO YAMADA" enables the image data to be partially displayed to an unauthorized user as shown in FIG. 5C. Similarly, specifying a query term such as "NEW CAR MODEL" or "X-MOTOR COMPANY" allows for a partial display of the image data as shown in FIG. 5D.

Figure 6A:
FIGS. 6A and 6B illustrate syntaxes of JPM codestreams, one with no security and the other with a SEC marker segment.
Figure 6B:
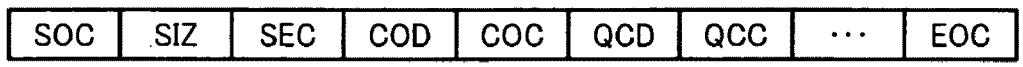

According to this patent specification, the encryption unit 12 performs the selective encryption based on security or protection capabilities applicable to JPEG 2000 images. FIGS. 6A and 6B illustrate syntaxes of JPM codestreams, one with no security and the other with such a security function.

As shown in FIGS. 6A and 6B, the basic syntax includes a Start of codestream (SOC) marker and an End of codestream (EOC) marker, indicating a beginning and an end, respectively, of a JPM codestream. The SOC marker is followed by multiple main header marker segments, including an Image and tile size (SIZ) marker segment, a Coding style default (COD) marker segment, a Quantization default (QCD) marker segment, a Quantization component (QCC) marker segment, etc., which together form a main header of the codestream. While not depicted in the drawing, the codestream syntax also contains multiple "tile-parts", i.e., sub-sets of JPEG 2000 image data representing "tiles" or portions of an image area.

In the codestream syntax, the SIZ marker segment provides information about the image represented by the codestream, such as image area size or reference grid size, tile size, offset of tiles in the reference grid, etc. The COD and COC marker segments contain information about coding style, including progression order in which tile-parts containing data from a specific layer, a specific component, a specific resolution, and a specific precinct are interleaved, as well as other parameters, such as number of layers, number of components, number of decomposition levels, precinct size, etc., used to compress components of an image or tile-parts. The QCD and QCC marker segments contain information about quantization used to compress image components.

With reference to FIG. 6B, the protected codestream has an additional Security (SEC) marker segment placed after the SIZ marker segment and before the COC marker segment. The SEC marker segment provides security that can render a specified portion of the codestream unavailable to an unauthorized user.

Figure 7:
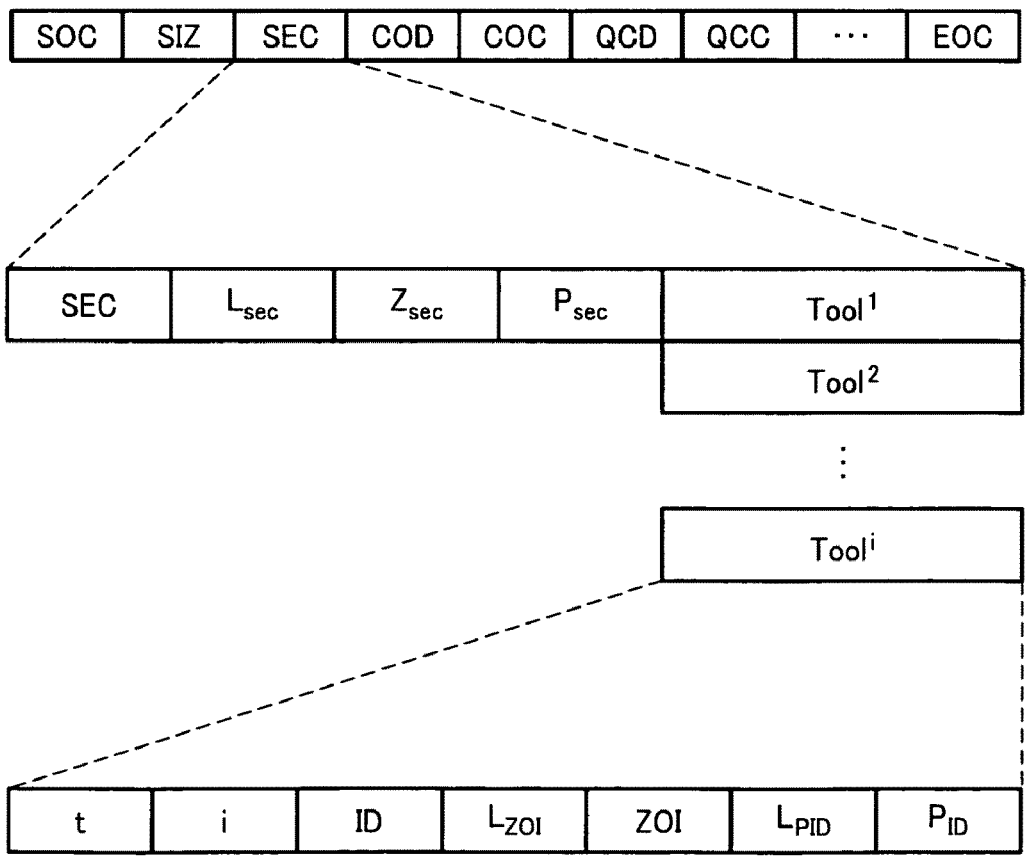
FIG. 7 illustrates detailed syntax of the SEC marker segment of FIG. 6B.

FIG. 7 illustrates detailed syntax of the SEC marker segment of FIG. 6B.

As shown in FIG. 7, the SEC marker segment includes a "SEC" marker identifying the segment type, followed by parameters "$L_{sec}$", "$Z_{sec}$", and "$P_{sec}$", and one or more "Tool" syntaxes. The parameter $L_{sec}$ indicates length of the SEC segment. The parameter $Z_{sec}$ is an identifier of the present SEC marker segment, for there may be multiple SEC segments in the JPM codestream. The parameter $P_{sec}$ describes security parameters common to the entire JPM codestream. The multiple Tool syntaxes each represent a security tool used to protect the image data.

Specifically, each Tool syntax includes a type parameter "t" indicating the security tool type, and an instance index "i" indicating an instance of the security tool, followed by fields "ID", "$L_{ZOI}$", "ZOI", "$L_{PID}$", and "PID". The field ID is a tool identifier assigned to the security tool. The field ZOI represents a Zone of Influence (ZOI) signaling where in the codestream the security tool is applied, preceded by the $L_{ZOI}$, indicating the length of the ZOI field. The field PID provides parameters for the security tool, with the preceding field $L_{PID}$ indicating the length of the PID field.

Thus, the SEC marker segment enables the selective encryption through application of a suitable encryption tool to a specified image portion or ZOI. In ZOI-based selective encryption, the encryption unit 12 extracts a portion to be encrypted from the image data and generates a SEC marker segment with a ZOI field indicating the extracted portion. The encryption unit 12 then encrypts the corresponding tile-parts or subsets of the image data in accordance with the generated SEC marker segment.

The encryption unit 12 may use a public key belonging to an authorized user to encrypt a ZOI in the image data, so that the encrypted data can be decrypted and unsecured using a corresponding private key. Such a private key may be provided to the authorized user prior to, or simultaneous with, the transmission of encrypted image data from the output unit 13. In case the user is authorized after the output of image data, it is also possible to provide a private key simultaneously with, or subsequent to, the user authorization.

Figure 8:
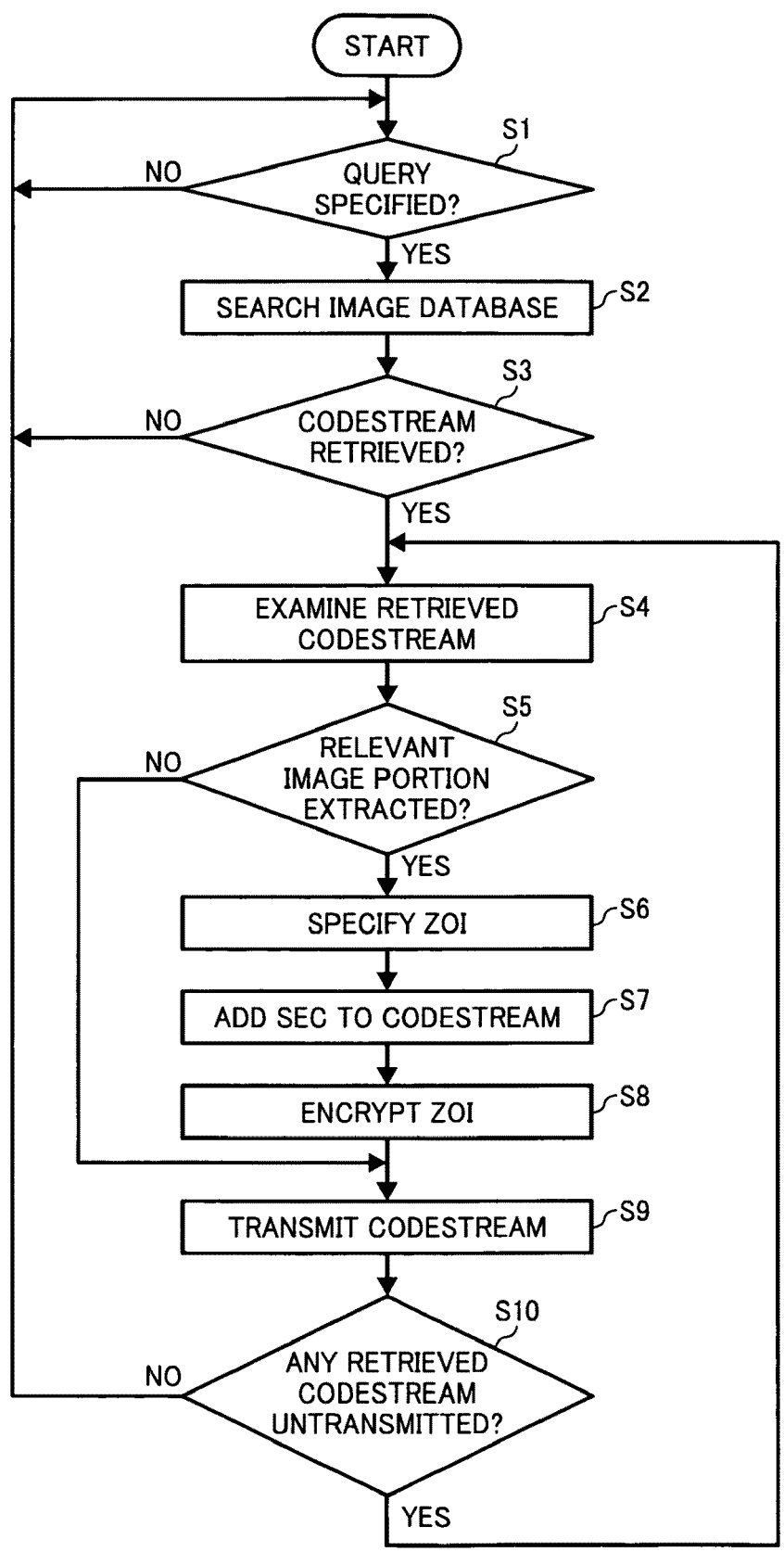
FIG. 8 is a flowchart illustrating an operation of the JPIP server of FIG. 1 according to one embodiment of this patent specification.

FIG. 8 is a flowchart illustrating operation of the JPIP server 1 according to one embodiment of this patent specification.

Upon receiving a query specified by the JPIP client 2 ("YES" in step S1), the data retrieval unit 11 searches the image database 10 for a relevant codestream by comparing the query against the hidden text keywords contained in codestreams of specific JPM files (step S2).

When no relevant codestream is retrieved for the specified query ("NO" in step S3), the output unit 13 notifies the JPIP client 2 of the absence of relevant data and the operation returns to step S1.

When one or more relevant codestreams are retrieved for the specified query ("YES" in step S3), the JPIP server 1 selectively encrypts each of the retrieved codestreams.

In the selective encryption, the encryption unit 12 first examines the codestream for a relevant image portion, i.e., image regions having hidden text keywords corresponding to the specified query (step S4).

When the relevant image portion is extracted from the codestream ("YES" in step S5), the encryption unit 12 specifies the entire image area represented by the codestream except for the extracted image portion as a ZOI for encryption (step S6).

Then, the encryption unit 12 generates a SEC marker segment with the specified ZOI and adds the generated security data to the original codestream (step S7), while partially encrypting the image data in accordance with the ZOI field (step S8).

Codestreams undergoing selective encryption or those from which no relevant image portion is extracted ("NO" in step S5) are forwarded to the output unit 13. The output unit 13 transmits each codestream to the JPIP client 2, preferably after removing the hidden text from the corresponding metadata (step S9). The output image data is displayed to the user partially or completely depending on the authorization of the user and on the relevance of the data to the specified query.

The encryption steps S4 through S9 are repeated as long as any codestream retrieved as relevant to the specified query remains untransmitted, and the operation returns to step S1 upon completing transmission of all the retrieved codestreams (step S10).

In a further embodiment, the JPIP server 1 according to this patent specification provides image data retrieval through the use of hidden text keywords and ZOI-based selective encryption in a manner different from that depicted in FIG. 4 and FIG. 8.

FIG. 9 shows an example of hidden text or associated keywords for the codestream representing the image area described in FIGS. 5A through 5D, used in the JPIP server 1 of the present embodiment.

As shown in FIG. 9, the hidden text is similar to that described in FIG. 4, except for the third section T13 defining a rectangular region R4 in FIG. 5A with an upper left corner (0, 110) and a lower right corner (480, 400), which has no keyword associated therewith.

As in the case of FIG. 4, every keyword contained in the hidden text (T11, T12, T13, and T14), whether or not associated with a particular image region, can be used to retrieve the codestream or image area when corresponding to a query term specified by a user on the JPIP client 2. Further, the image regions R3 and R2 having the hidden text keywords (T11 and T12, respectively) represent a portion to be viewed by a user specifying a query term corresponding to the keyword, whether the user is authorized or unauthorized.

In contrast to the FIG. 4 case, the image region R4 having no hidden text keyword (T13) represents a confidential portion that cannot be viewed by an unauthorized user irrespective of the query term used to retrieve the image area.

In the present embodiment, the JPIP server 1 encrypts an irrelevant or confidential image portion in an entire image area instead of encrypting an entire image area except for a portion relevant to the specified query. Specifically, the encryption unit 12 selectively encrypts an irrelevant region having an associated keyword not corresponding to the specified query, as well as a confidential region having no keyword associated therewith, leaving an unencrypted image region having an associated keyword corresponding to the specified query. The selective encryption is carried out based on the SEC marker segment or ZOI as depicted in FIGS. 6A through 7.

For example, the region R3 is encrypted unless a query term such as "X-MOTOR PRESIDENT" or "TARO YAMADA" is specified, but remains unencrypted when such a query term is specified. Similarly, the region R2 is encrypted unless a query term such as "NEW CAR MODEL" or "X-MOTOR COMPANY" is specified, but remains unencrypted when such a query term is specified. In addition, the region R4, defined without any associated keyword, is subjected to encryption irrespective of the query term used to retrieve the codestream.

Such selective encryption results in the retrieved image data being displayed completely for an authorized user and partially for an unauthorized user as described in FIGS. 5B through 5D.

Figure 10:
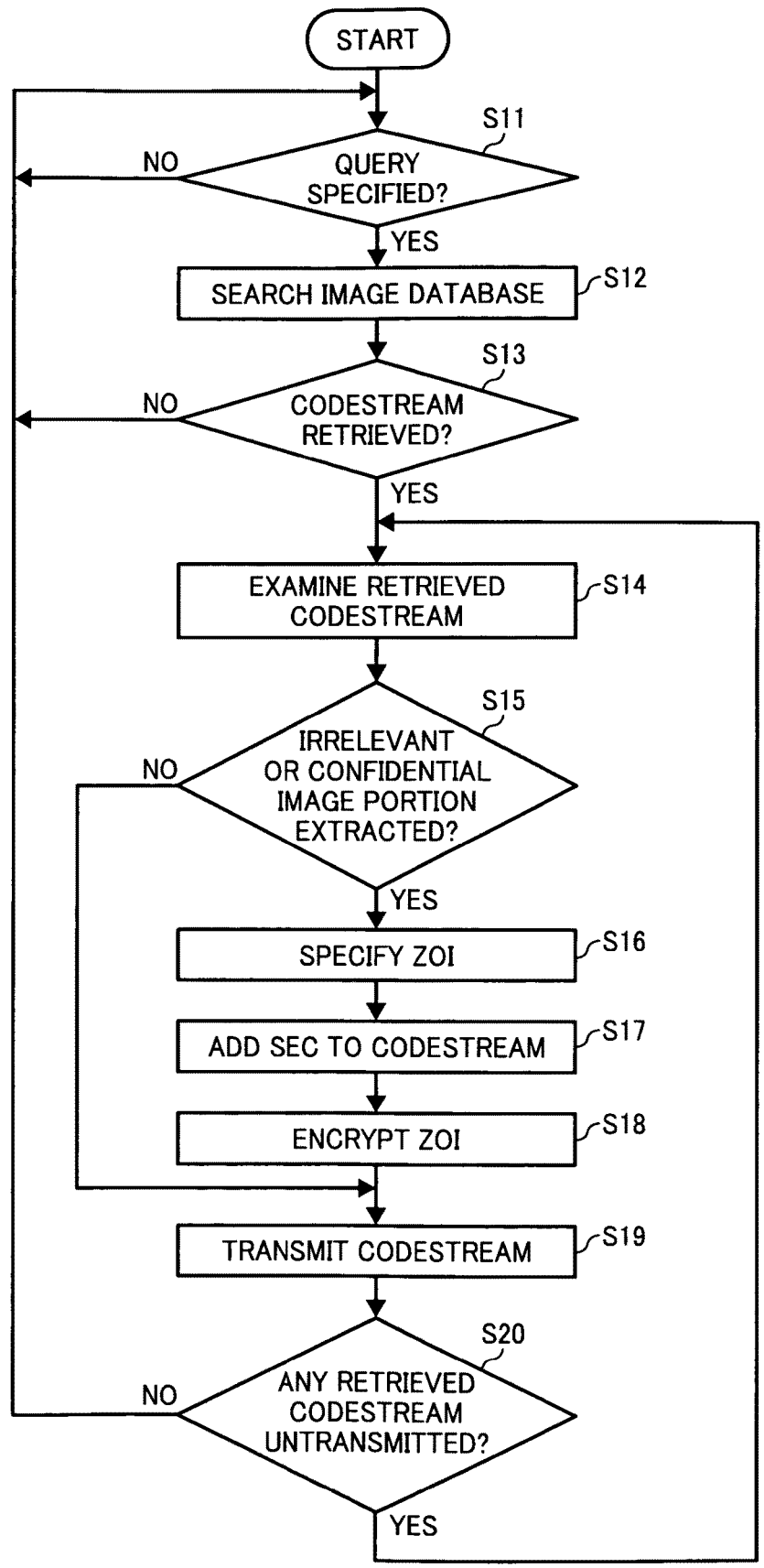
FIG. 10 is a flowchart illustrating an operation of the JPIP server of FIG. 1 according to another embodiment of this patent specification.

FIG. 10 is a flowchart illustrating operation of the JPIP server 1 of the present embodiment.

Upon receiving a query specified by the JPIP client 2 ("YES" in step S11), the data retrieval unit 11 searches the image database 10 for a relevant codestream by comparing the query against hidden text keywords contained in the codestreams of specific JPM files (step S12).

When no relevant codestream is retrieved for the specified query ("NO" in step S13), the output unit 13 notifies the JPIP client 2 of the absence of relevant data and the operation returns to step S11.

When one or more relevant codestreams are retrieved for the specified query ("YES" in step S13), the JPIP server 1 selectively encrypts each of the retrieved codestreams.

In the selective encryption, the encryption unit 12 first examines the codestream for an irrelevant or confidential image portion, i.e., image regions having hidden text keywords not corresponding to the specified query, or those having no hidden text keyword associated therewith (step S14).

When the irrelevant or confidential image portion is extracted from the codestream ("YES" in step S15), the encryption unit 12 specifies the extracted image portion as a ZOI for encryption (step S16).

Then, the encryption unit 12 generates a SEC marker segment with the specified ZOI, and adds the generated security data to the original codestream (step S17), while partially encrypting the image data in accordance with the ZOI field (step S18).

Codestreams undergoing selective encryption, or those from which no irrelevant or confidential image portion is extracted ("NO" in step S15) are forwarded to the output unit 13. The output unit 13 transmits each codestream to the JPIP client 2, preferably after removing the hidden text from the corresponding metadata (step S19). The output image data is displayed to the user partially or completely depending on the authorization of the user and on the relevance of the data to the specified query.

The encryption steps S14 through S19 are repeated as long as any codestream retrieved as relevant to the specified query remains untransmitted, and the operation returns to step S11 upon completing transmission of all the retrieved codestreams (step S20).

In a still further embodiment, the JPIP server 1 retrieves relevant image data by primarily retrieving JPM files relevant to a specified query and subsequently examining codestreams contained in the retrieved JPM files, instead of examining codestreams of all the JPM files stored in the image database 10.

Specifically, the JPIP server 1 according to the present embodiment includes a lookup table listing primary keywords associated with specific JPM files stored in the image database 10. Upon receiving a query specified by a user on the JPIP client 2, the data retrieval unit 11 refers to the lookup table and compares the specified query against the list of primary keywords.

FIG. 11 shows an example of such a lookup table for listing primary keywords associated with JPM files.

As shown in FIG. 11, the primary keywords may be any word or phrase relevant to documents containing JPEG 2000 image data, including those derived from adjacent text or captioning of images, or those determined based on other, arbitrary factors.

Figure 12:
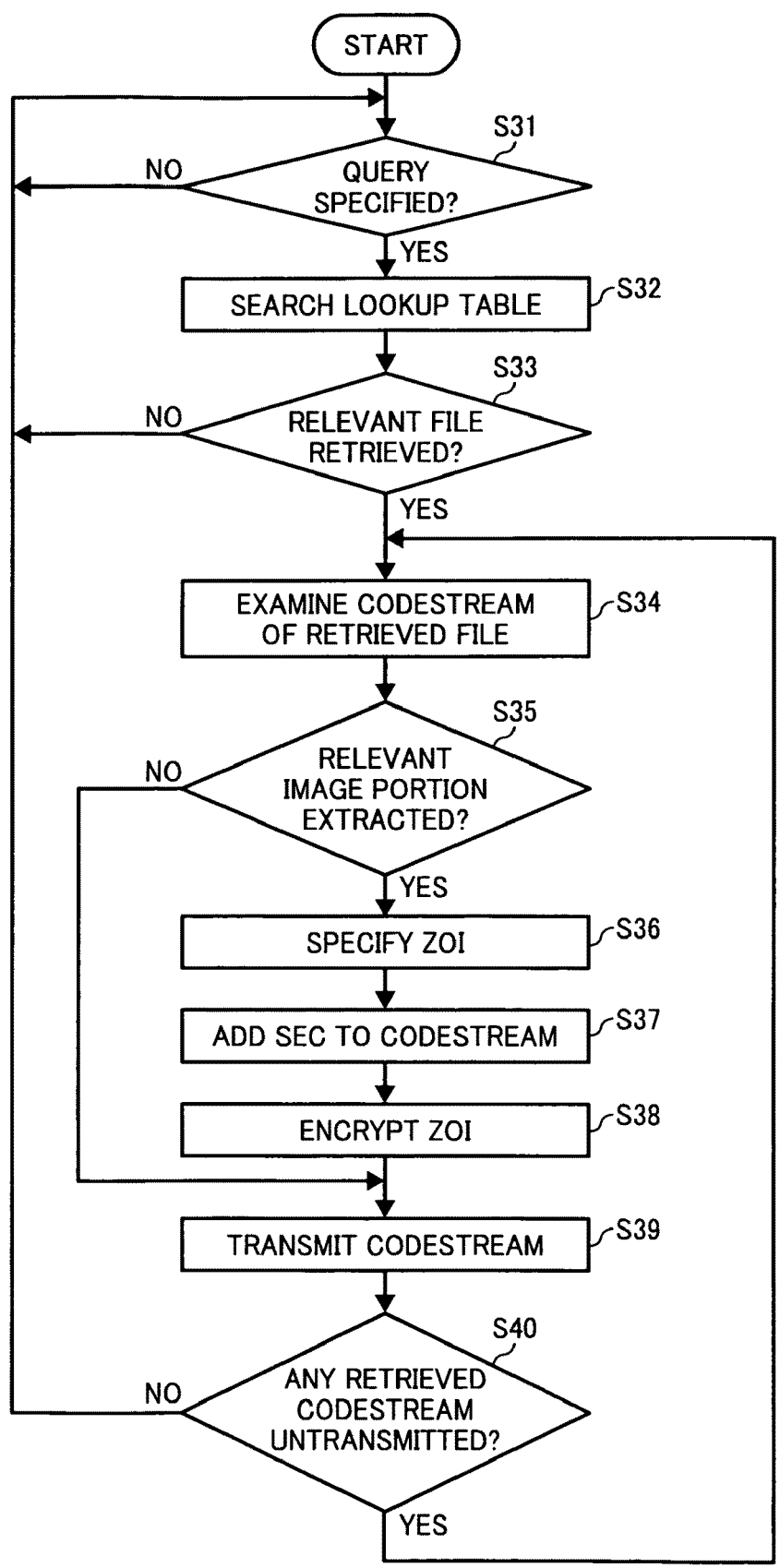
FIG. 12 is a flowchart illustrating an operation of the JPIP server of FIG. 1 using the primary keyword lookup table of FIG. 11.

FIG. 12 is a flowchart illustrating an operation of the JPIP server 1 using the primary keywords for retrieving JPM files.

Upon receiving a query specified by the JPIP client 2 ("YES" in step S31), the data retrieval unit 11 searches the lookup table for a relevant JPM file by comparing the specified query against the primary keywords associated with specific JPM files (step S32).

When no relevant JPM file is retrieved for the specified query ("NO" in step S33), the output unit 13 notifies the JPIP client 2 of the absence of relevant data and the operation returns to step S31.

When one or more relevant JPM files are retrieved for the specified query ("YES" in step S33), the JPIP server 1 selectively encrypts codestreams contained in the retrieved JPM files.

The selective encryption and subsequent data transmission may be performed in a manner similar to that depicted in steps S4 through S9 of FIG. 8 or to that depicted in steps S14 through S19 of FIG. 10 (step S34 through S39), so that the output image data is displayed to the user partially or completely depending on the authorization of the user and on the relevance of the data to the specified query. The encryption steps S34 through S39 are repeated as long as any codestream in the retrieved JPM files remains untransmitted, and the operation returns to step S31 upon completing transmission of all the retrieved codestreams (step S40).

Thus, the image retrieval system according to this patent specification provides convenient retrieval and display of image data without compromising security, where even an unauthorized user can view a portion of secured image data which is relevant to the specified query.

Numerous additional modifications and variations are possible in light of the above teachings. For example, although the embodiments described herein utilize hidden text in the JPM file to indicate relevance of image data to user-specified queries and to determine availability of respective areas of image data, it is also possible to provide an external file used to manage the relevancy and availability of image data. It is therefore to be understood that, within the scope of the appended claims, the disclosure of this patent specification may be practiced otherwise than as specifically described herein.

Further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Still further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy Disks®, cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An image retrieval system that provides secured image data in response to a query specified by a user, the system comprising:
    a data retrieval unit configured to retrieve image data representing an image formed of one or more image regions each having a keyword associated therewith where the specified query corresponds to a keyword associated with at least one of the image regions;
    an encryption unit configured to at least partially encrypt the retrieved image data according to the specified query; and
    an output unit configured to output the at least partially encrypted image data to the user, wherein
    the encryption unit is configured to encrypt an image region that does not have an associated keyword corresponding to the specified query, such that the encrypted image region is decryptable by the user only when the user is authorized to view the entire image,
    the at least one of the image regions that has the associated keyword corresponding to the specified query remains unencrypted and viewable by the user even where the user is unauthorized to view the entire image.

2. The image retrieval system according to claim 1, wherein the encryption unit selectively encrypts the entire image except for an image region having an associated keyword corresponding to the specified query.

3. The image retrieval system according to claim 1, wherein the encryption unit selectively encrypts an image region having an associated keyword not corresponding to the specified query.

4. The image retrieval system according to claim 1, wherein the encryption unit encrypts the image data using a public key belonging to an authorized user.

5. The image retrieval system according to claim 1, wherein the encrypted image portion is decryptable using a private key provided in advance to an authorized user.

6. The image retrieval system according to claim 1, wherein the output unit provides an authorized user with a private key used to decrypt the encrypted image portion.

7. The image retrieval system according to claim 1, wherein the image data is coded into a codestream of a JPEG 2000 image file.

8. The image retrieval system according to claim 7, wherein the associated keyword is described in a hidden text stored in a Metadata box of a Layout Object box contained in the JPEG 2000 image file, and the data retrieval unit references the hidden text to determine relevance of the image data to the specified query.

9. The image retrieval system according to claim 8, wherein the encrypted portion is specified in a Zone of Influence field included in a Security maker segment inserted in the codestream.

10. An image retrieval method for an image retrieval system configured to provide secured image data in response to a query specified by a user, the method comprising:
    retrieving image data representing an image formed of one or more image regions each having a keyword associated therewith where the specified query corresponds to a keyword associated with at least one of the image regions;

at least partially encrypting the retrieved image data according to the specified query; and outputting the at least partially encrypted image data to the user, wherein an image region that does not have an associated keyword corresponding to the specified query is encrypted so as to be decryptable by the user only when the user is authorized to view the entire image, the at least one of the image regions that has the associated keyword corresponding to the specified query remains unencrypted so as to be viewable by the user even where the user is unauthorized to view the entire image.

11. The image retrieval method according to claim 10, wherein the encryption selectively encrypts the entire image except for an image region having an associated keyword corresponding to the specified query.

12. The image retrieval method according to claim 10, wherein the encryption selectively encrypts an image region having an associated keyword non-corresponding to the specified query.

13. The image retrieval method according to claim 10, wherein the encryption unit encrypts the image data using a public key belonging to an authorized user.

14. The image retrieval method according to claim 10, wherein the encrypted image portion is decryptable using a private key provided in advance to an authorized user.

15. The image retrieval method according to claim 10, wherein an authorized user is provided by the output unit with a private key used to decrypt the encrypted image portion.

16. The image retrieval method according to claim 10, wherein the image data is coded into a codestream of a JPEG 2000 image file.

17. The image retrieval method according to claim 16, wherein the associated keyword is described in a hidden text stored in a Metadata box of a Layout Object box contained in the JPEG 2000 image file, and the data retrieval references the hidden text to determine relevance of the image data to the specified query.

18. The image retrieval method according to claim 17, wherein the encrypted portion is specified in a Zone of Influence field included in a Security maker segment inserted in the codestream.

* * * * *

UNITED STATES PATENT AND TRADEMARK OFFICE
CERTIFICATE OF CORRECTION

PATENT NO.        : 8,261,092 B2
APPLICATION NO.   : 12/314110
DATED             : September 4, 2012
INVENTOR(S)       : Maiko Takenaka et al.

It is certified that error appears in the above-identified patent and that said Letters Patent is hereby corrected as shown below:

On the title page, item [75] should read

--(75)   Inventors:     Maiko Takenaka, Kanagawa (JP);

Shogo Oneda, Tokyo (JP)--

Signed and Sealed this
Twentieth Day of November, 2012

David J. Kappos
*Director of the United States Patent and Trademark Office*